United States Patent [19]
Tanaka et al.

[11] Patent Number: 4,764,877
[45] Date of Patent: Aug. 16, 1988

[54] SURFACE CUTTING METHOD

[75] Inventors: Kunio Tanaka; Yasushi Onishi, both of Tokyo, Japan

[73] Assignee: Fanuc Ltd., Minamitsuru, Japan

[21] Appl. No.: 43,349

[22] PCT Filed: Jul. 21, 1986

[86] PCT No.: PCT/JP86/00381

§ 371 Date: Mar. 17, 1987

§ 102(e) Date: Mar. 17, 1987

[87] PCT Pub. No.: WO87/00475

PCT Pub. Date: Jan. 29, 1987

[30] Foreign Application Priority Data

Jul. 20, 1985 [JP] Japan .................................. 60-160893

[51] Int. Cl.$^4$ .......................... B23Q 15/00; G05B 19/00
[52] U.S. Cl. ..................................... 364/474; 364/170; 318/572
[58] Field of Search .............................. 364/167–171, 364/474, 475; 318/572

[56] References Cited

U.S. PATENT DOCUMENTS 4,621,959 11/1986 Kishi et al. ...................... 364/475 X
4,706,200 11/1987 Kishi et al. .......................... 364/474
4,706,201 11/1987 Kishi et al. .......................... 364/474

*Primary Examiner*—Jerry Smith
*Assistant Examiner*—Allen MacDonald
*Attorney, Agent, or Firm*—Staas & Halsey

[57] ABSTRACT

The present invention relates to a surface cutting method for cutting a surface within an area (AR) bounded by a predetermined closed curve (CCL) by moving a tool (TL) along a cutting path ($PT_i$) in a predetermined direction (direction of arrow A) to cut the surface within the area, thenceforth moving the tool along an adjacent cutting path ($PT_{i+1}$), obtained by a shift of a predetermined amount, to cut the surface, and repeating these surface cutting operations.

The surface cutting method includes obtaining an offset curve (OFC) offset by a predetermined amount to the outer side of the closed curve (CCL), obtaining width W, in the shift direction (direction of arrow B), of the area bounded by the offset curve (OFC), finding, from among lengths of line segments obtained by dividing the width W into n equal parts, a length closest to a predetermined maximum cut-in amount without exceeding the same, adopting this length as an actual cut-in amount P, and performing surface cutting by shifting the tool (TL) by the cut-in amount P in the shift direction after the end of surface cutting along the cutting path $PT_i$, and thereafter moving the tool along the adjacent cutting path $PT_{i+1}$. A cutting starting point ($P_i$) and cutting end point ($Q_i$) of each cutting path are provided on an offset curve (OFC') offset by a predetermined amount to the outer side of the closed curve (CCL) specifying the area.

4 Claims, 4 Drawing Sheets

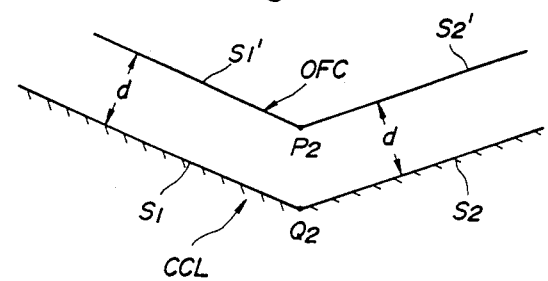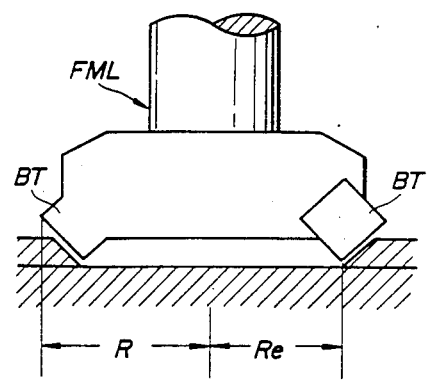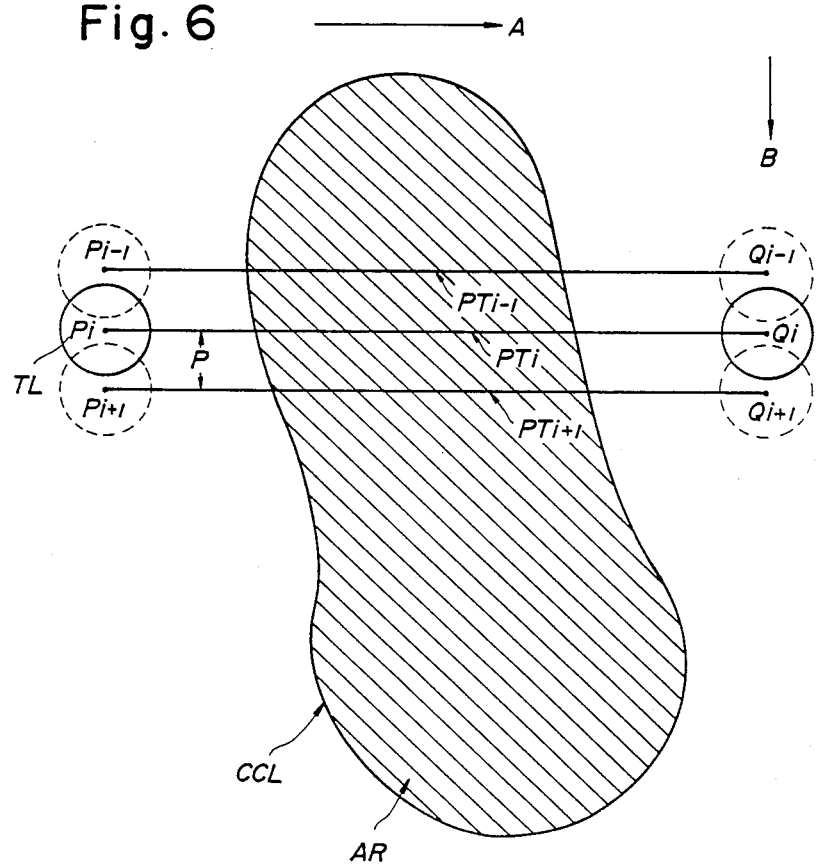

SURFACE CUTTING METHOD

TECHNICAL FIELD

This invention relates to a surface cutting method and, more particularly, to a surface cutting method for cutting a surface within an area bounded by a closed curve by moving a tool along a cutting path to cut the surface within the area, thenceforth moving the tool along an adjacent cutting path, obtained by a shift of a predetermined amount, to cut the surface, and repeating these surface cutting operations.

BACKGROUND ART

A form of numerically controlled machining is one in which there is an area bounded by a closed curve, wherein surface cutting is applied to a portion (convex portion) projecting from an area on the outer side of the closed curve.

Such an area cutting (surface cutting) method includes the following steps:

(a) inputting data specifying a closed curve CCL of an area AR shown in FIG. 6, cutting direction (direction of arrow A) along cutting path $PT_i$ (i=1, 2, ...), shift direction (direction of arrow B) in which a tool TL is shifted by a predetermined amount of cut-in whenever surface cutting along the cutting path $PT_i$ ends, and cut-in amount P;

(b) generating the cutting path $PT_i$ on the basis of the inputted data;

(c) performing cutting by moving the tool along the cutting path $PT_i$ from a cutting starting point $P_i$ to a cutting end point $Q_i$ on the generated cutting path $PT_i$;

(d) obtaining the next cutting path $PT_{i+1}$, which results when the tool is shifted by the amount of cut-in P following the end of cutting along the preceding cutting path;

(e) thereafter performing cutting (unidirectional cutting) by moving the tool from point $P_{i+1}$ to point $Q_{i+1}$, in which point $P_{i+1}$ is taken as the cutting starting point of cutting path $PT_{i+1}$ and point $Q_{i+1}$ is taken as the cutting end point of cutting path $PT_{i+1}$, or performing cutting (back-and-forth cutting) by moving the tool from point $Q_{i+1}$ to point $P_{i+1}$, in which point $Q_{i+1}$ is taken as the cutting starting point of cutting path $PT_{i+1}$ and point $P_{i+1}$ is taken as the cutting end point of cutting path $PT_{i+1}$; and (f) repeating the unidirectional or back-and-forth cutting operation from this point onward to surface-cut the area AR.

In the conventional surface cutting method, the positions of the cutting starting point and cutting end point of each cutting path PTi are set appropriately. This results in a long tool pass, namely in a lengthy period of time during which surface cutting is not carried out. Consequently, machining efficiency is poor.

In addition, since the actual cut-in amount P is decided appropriately in the prior art, the amount of cut-in is too small and results in a large number of cutting strokes (cutting paths) and diminished cutting efficiency, or the amount of cut-in may be non-uniform (e.g. the last cut-in being very small in comparison with the others).

Accordingly, an object of the present invention is to provide a surface cutting method through which tool pass can be shortened, the number of cutting strokes reduced and the amount of cut-in made uniform.

DISCLOSURE OF THE INVENTION

The present invention relates to a surface cutting method for cutting a surface within an area bounded by a predetermined closed curve by moving a tool along a cutting path in a predetermined direction to cut the surface within the area, thenceforth moving the tool along an adjacent cutting path, obtained by a shift of a predetermined amount, to cut the surface, and repeating these surface cutting operations.

The surface cutting method includes obtaining an offset curve offset by a predetermined amount to the outer side of the closed curve, obtaining width W, in a shift direction, of the area bounded by the offset curve, finding, from among lengths of line segments obtained by dividing the width W into n equal parts, a length closest to a predetermined maximum cut-in amount without exceeding the same, adopting this length as an actual cut-in amount P, and performing surface cutting by shifting the tool by the cut-in amount P in the shift direction after the end of surface cutting along a cutting path $PT_i$, and thereafter moving the tool along an adjacent cutting path $PT_{i+1}$.

The cutting starting point and cutting end point of each cutting path are provided on an offset curve offset by (T+C+R) to the outer side of the closed curve specifying the area.

BRIEF DESCRIPTION OF THE DRAWINGS

FIG. 4 is a view for describing offset processing;

FIG. 5 is an explanatory view illustratng a tool radius R and effective tool radius $\bar{R}$; and FIG. 6 is a view for describing the prior-art method.

BEST MODE FOR CARRYING OUT THE INVENTION

Figure 1A:
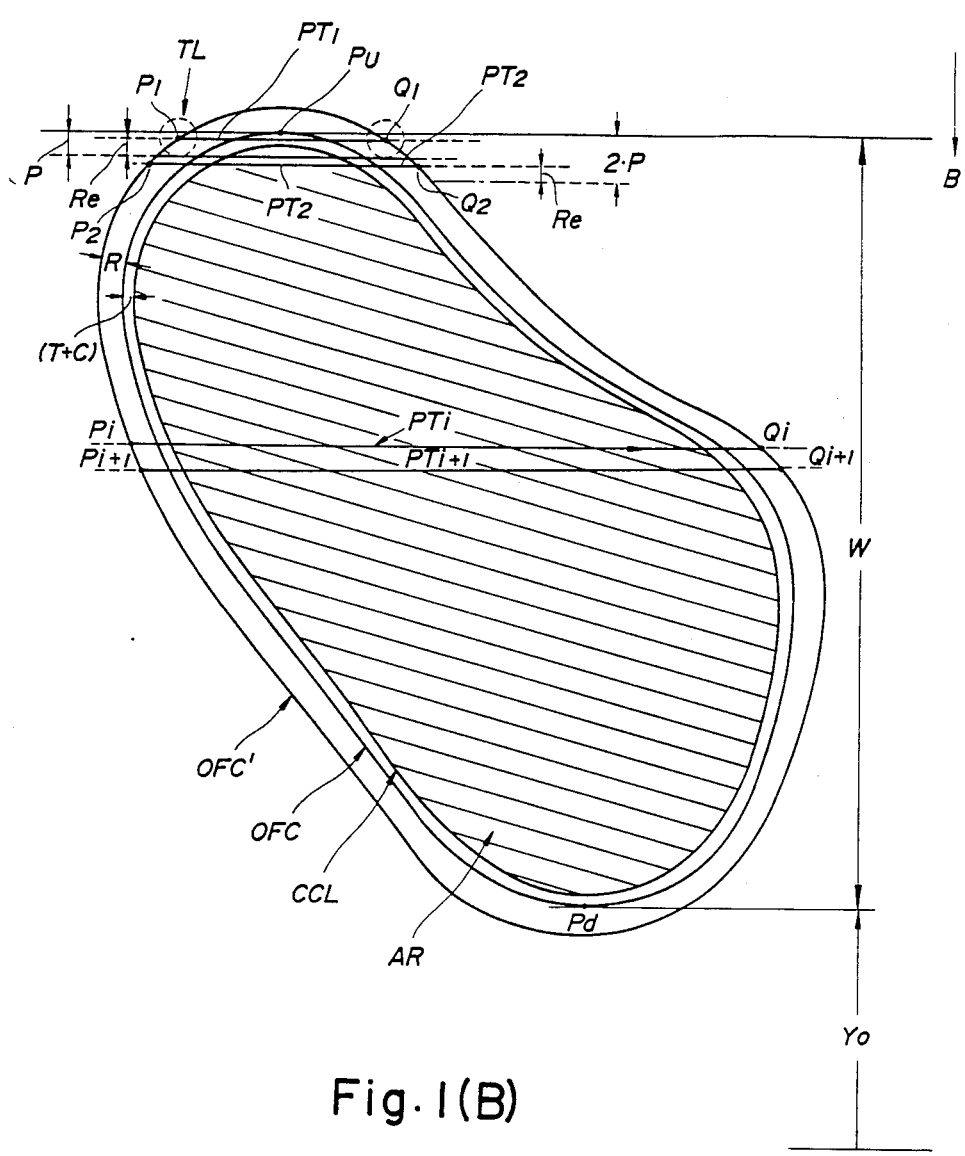
FIG. 1 is a view for describing the general features of the present invention.
Figure 1B:
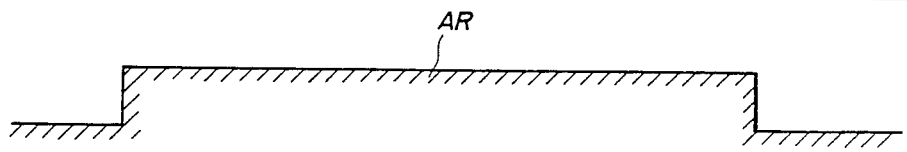

FIG. 1 is a view for describing the general features of the present invention. In the Figure, CCL represents a closed curve, and AR (the shaded portion) denotes the area to undergo surface machining bounded by the closed curve CCL. OFC designates an offset curve offset to the outer side of the closed curve CCL by the sum of excess thickness T and amount of clearance C. OFC' is an offset curve offset to the outer side of the closed curve by (T+C+R), where R is the tool radius. Re designates the effective tool radius. The arrow A indicates the direction of the cutting path, arrow B indicates the direction of a shift, W denotes the width of the area A in the shift direction, $PT_i$ (i=1, 2 ...) denotes a tool path, and P represents the amount of cut-in.

The area AR can be surface-cut reliably and tool pass in the cutting path direction can be minimized in length if the cutting starting point $P_i$ and cutting end point $Q_i$ of each cutting path $PT_i$ (i=1, 2, ...) are situated on the offset curve OFC' offset, to the outer side of the closed path CCL specifying the area AR to be surface-cut, by (T+C+R).

When the length of line segments, obtained by dividing the shift-direction width W of the area AR into n equal parts, is nearest a predetermined maximum cut-in amount without exceeding the same, surface cutting can be performed at a uniform cut-in amount (W/n every stroke) if the aforementioned length is adopted as the actual cut-in amount P. This will also make it possible to perform surface cutting by successively moving the tool a small number of times (=n times), i.e. along n cutting paths.

Therefore, in accordance with the invention, the first step is to obtain the offset curve OFC offset by the predetermined amount (=T+C) to the outer side of the closed curve CCL.

Next, the width W in the shift direction (the direction of arrow B) of the area bounded by the offset curve OFC is found, and so is the length of line segments, which are obtained by dividing the width W into n (n is an integer) equal parts, closest to a predetermined maximum cut-in amount without exceeding the same. The length is adopted as the actual cut-in amount P.

Thereafter, the position Y of the i-th cutting path $PT_i$ in the shift direction is obtained in accordance with the following equation:

$$Y = Y_0 + W - i \cdot P + R_e$$

where $Y_0$ represents the position of the lowermost end of the area AR in the shift direction, and $R_e$ represents effective tool radius.

When the position Y of the cutting path $PT_i$ has been found, points of intersection $P_i$, $Q_i$ are obtained between the cutting path $PT_i$ and the offset curve OFC' offset by (T+C+R) to the outer side of the closed curve CCL, where represents excess thickness, C amount of clearance and R tool radius.

Surface cutting is performed along the cutting path $PT_i$ from the point of intersection $P_i$ to the point of intersection $Q_i$. Surface cutting along this path is executed n times.

Figure 2:
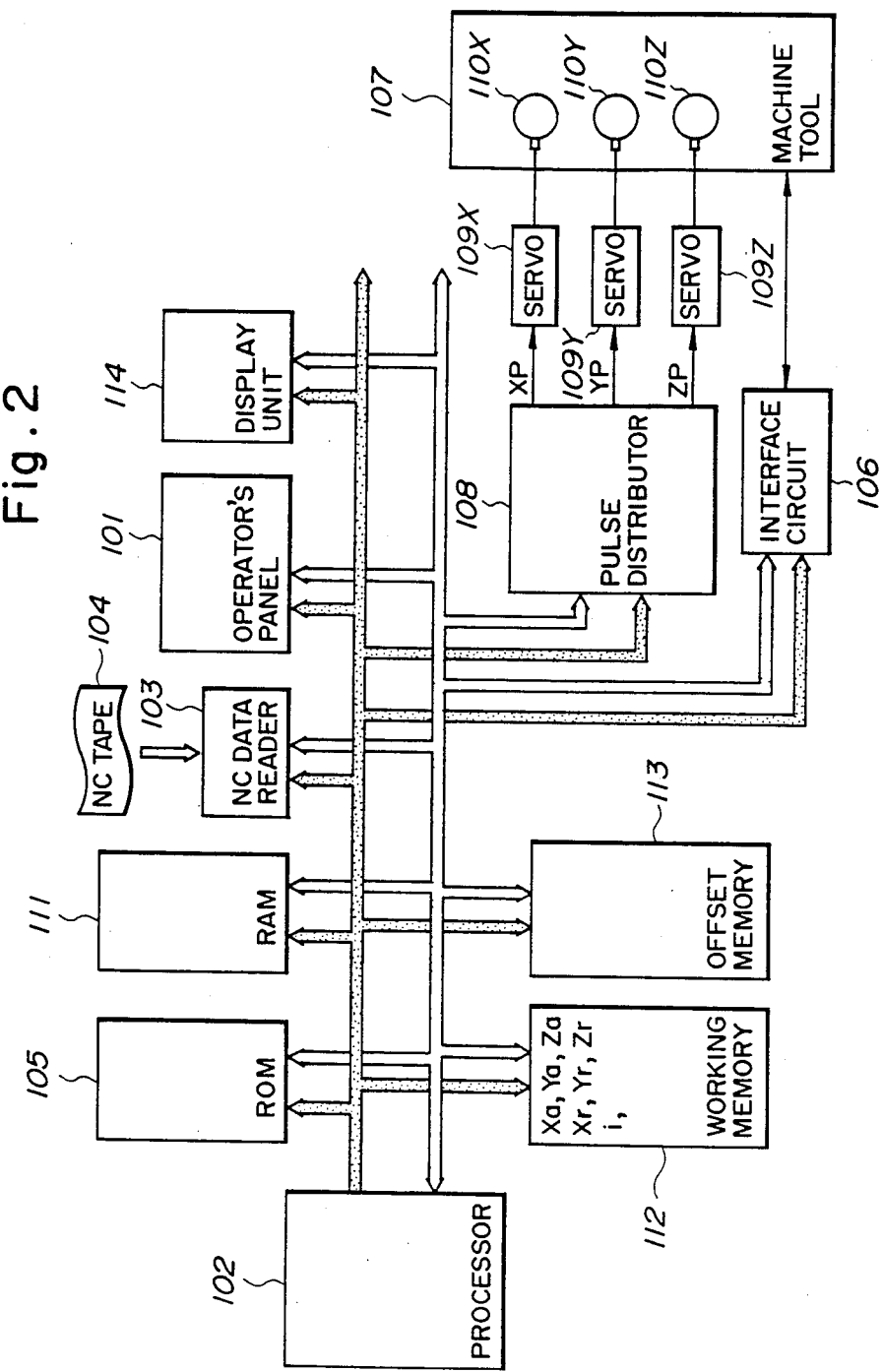
FIG. 2 is a block diagram of an apparatus for realizing the present invention.
Figure 3:
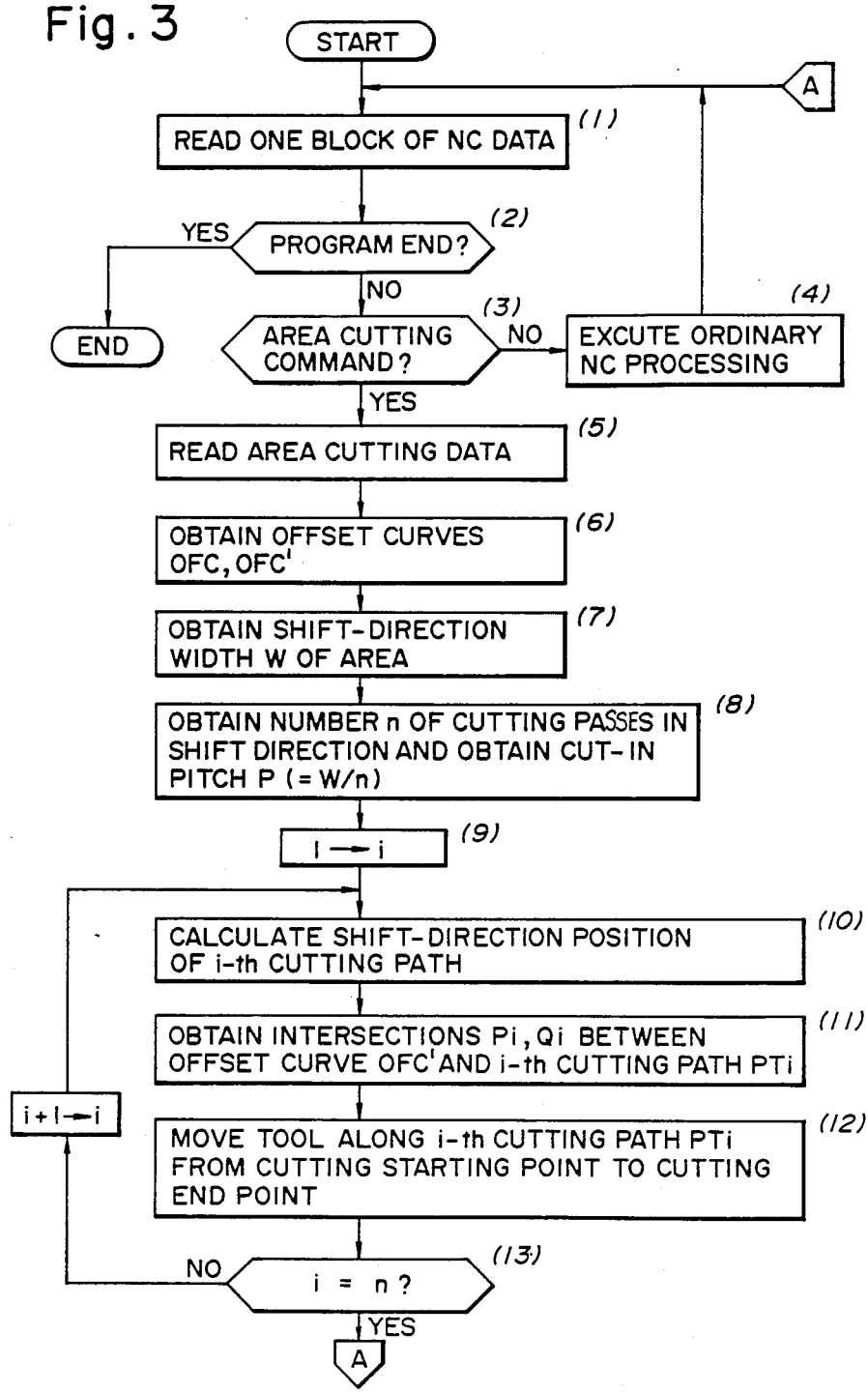
FIG. 3 is a flowchart of processing indicative of the surface cutting method of the present invention.

FIG. 2 is a block diagram of an embodiment of the invention, and FIG. 3 is a flowchart of processing according to the invention. The area cutting method of the invention will now be described with reference to FIGS. 1, 2 and 3.

(1) When a cycle start button on an operator's panel 101 is pressed, a processor 102 causes an NC data reader 103 to read one block of NC data from an NC tape 104. The NC tape 104 stores area cutting (surface cutting) data in addition to ordinary path data, G-function instruction data and M-, S- and T-function instruction data. Stored at the end of the NC program is an M code (M02) indicating program end. Placed at the beginning of the area cutting data is an area cutting command indicating that the data which follow it are the area cutting data. Placed at the end of the area cutting data is a code indicative of the end of the area cutting data.

(2) The processor 102, placed under the control of a control program stored in a ROM 105, checks whether an item of the read NC data is "M02", which is indicative of program end. If the item of data is "M02", numerical control processing is ended.

(3) If the item of read NC data is not "M02" indicative of program end, then the processor 102 checks whether the item of NC data is the area cutting command.

(4) If the item of NC data is not the area cutting command, the processor 102 executes ordinary numerical control processing.

By way of example, if an item of NC data is an M-, S- or T-function instruction, the processor delivers the data to a machine tool 107 via an interface circuit 106. When the machine tool 107 generates a completion signal indicating completion of processing for the M-, S- or T-function instruction, the processor causes the NC data reader 103 to read the next item of NC data.

If the item of NC data is path data, then the processor obtains incremental values $X_i$, $Y_i$, $Z_i$ along the respective axes, obtains traveling distances $\Delta X$, $\Delta Y$, $\Delta Z$, which are to be traversed along the respective axes per unit time $\Delta T$, from the aforementioned incremental values and commanded feed velocity F, and delivers these to a pulse distributor 108.

On the basis of the input data ($\Delta X$, $\Delta Y$, $\Delta Z$), the pulse distributor 108 performs a simultaneous three-axis pulse distribution calculation to generate distributed pulses $X_P$, $Y_P$, $Z_P$. The distributed pulses are applied as inputs to servo circuits 109X, 109Y, 109Z for the respective axes, thereby rotating servomotors 110X, 110Y, 110Z so that the tool is moved along the cutting path.

The processor 102, in accordance with the following formulae, updates the present position $X_a$, $Y_a$ $Z_a$ along the respective axes every $\Delta T$ sec, $X_a$, $Y_a$, $Z_a$ having been stored in a working memory 112:

$$X_a \pm \Delta X \rightarrow X_a \quad (1a)$$

$$Y_a \pm \Delta Y \rightarrow Y_a \quad (1b)$$

$$Z_a \pm \Delta Z \rightarrow Z_a \quad (1c)$$

The sign depends upon the direction of movement. Similarly, in accordance with the following formulae, the processor 102 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the working memory 112:

$$X_r - \Delta X \rightarrow X_r \quad (2a)$$

$$Y_r - \Delta Y \rightarrow Y_r \quad (2b)$$

$$Z_r - \Delta Z \rightarrow Z_r \quad (2c)$$

When the following condition is established:

$$X_r = Y_r = Z_r = 0 \quad (5)$$

this means that the tool has arrived at the target position. The processor 102 then causes the NC data reader 103 to read the next item of NC data.

(5) If the item of NC data is found to be the area cutting command at the decision step (3), the processor 102 causes the NC data reader 103 to read the area cutting data and store the data in a RAM 111 until the code indicating the end of the area cutting data is read out. It should be noted that the area cutting data are as follows:

(i) data indicating surface cutting or pocket cutting (assumed here to be the former);

(ii) data specifying the curve (closed curve) CCL of the external shape of the are AR;

(iii) cutting path direction data (the direction of arrow A in FIG. 1, taken to be the +X direction);

(iv) shift direction data (the direction of arrow B in FIG. 1, taken to be the −Y direction);

(v) maximum amount of cut-in D (vi) cutting velocity;

(vii) excess thickness T; and (viii) amount of clearance C.

(6) When the reading of the area cutting data ends, the processor 102 calculates the offset curve OFC (see FIG. 1) offset from the closed curve CCL by a distance d (=T+C) obtained by adding the excess thickness T and amount of clearance C. It should be noted that the offset curve OFC is found through the following processing. Specifically, as shown in FIG. 4, let two straight lines specifying the closed curve CCL be S1 and S2. Straight lines S1', S2' offset from the straight lines S1, S2, respectively, by the distance d are found. The intersection P2 of the straight lines S1', S2' is then found. The intersection P2 is on point specifying the offset curve OFC. Accordingly, if points of intersection are found in a similar manner and stored in the RAM 111, the offset curve OFC will be obtained. Obtained together with the offset curve OFC is the offset curve OFC' offset to the outer side of the closed curve CCL by (T+C+R). Note that R is the tool radius and is stored in correspondence with a tool number in a offset memory 113.

(7) Next, the processor 102 obtains the width W, in the shift direction (direction of arrow B), of the area bounded by the offset curve OFC.

If the coordinate values $Y_{max}$, $Y_{min}$ of the uppermost and lowermost points $P_u$, $P_d$, respectively, of the offset curve OFC in the shift direction are obtained, the shift-direction width W of the area to be surface-cut can be found from the following formula:

$$Y_{max} - Y_{min} \rightarrow W \quad (4)$$

(8) When the width W has been found, the processor 102 determines the length of line segments, obtained by dividing the width W into n (an integer) equal parts, nearest a preset maximum cut-in amount D without exceeding the same. This length is made the actual cut-in amount P (=W/n).

(9) When the cut-in amount P has been found, the processor performs the operation 1→i.

(10) Adopting $R_e$ as the effective tool radius, the processor 102 obtains the position Y of the i-th cutting path $PT_i$ in the shift direction in accordance with the equation $$Y = Y_0 + W - i \cdot P + R_e \quad (5)$$

Note that $Y_0$ is the coordinate ($=Y_{min}$) of the lowermost point $P_d$ of the offset curve OFC. The effective tool radius $R_e$ is stored together with the tool radius R in correspondence with a tool number in the offset memory 113. Accordingly, the effective tool radius $R_e$ corresponding to a commanded tool number can be obtained by reading it from the memory.

The effective tool radius $R_e$ is the radius of the tool that actually participates in surface cutting. FIG. 5 illustrates the relationship between tool radius R and effective tool radius $R_e$ in the case of a face milling machine FML. In FIG. 5, BT represents the blade edge.

(11) When the shift-direction position Y of the i-th cutting path $PT_i$ has been found, the points of intersection $P_i$, $Q_i$ between the cutting path $P_i$ and offset curve OFC' are calculated.

In a case where surface cutting is performed by unidirectional cutting in the +X direction, whichever of the points of intersection $P_i$, $Q_i$ has the smaller X coordinate is the cutting starting point. In case of back-and-forth surface cutting, the points of intersection having the smaller and larger values alternate as the cutting starting point.

(12) When the cutting starting point and cutting end point have been found, the processor 102 executes path processing similar to that of step (4) to move the tool along the i-th cutting path $PT_i$ from the cutting starting point to the cutting end point.

(13) When cutting along the i-th cutting path ends, the processor 102 checks whether i=n holds.

If i=n holds, surface cutting of area AR ends and processing is executed from step (1) onward.

(14) If i<n holds, on the other hand, then the processor increments i in accordance with the expression $$i+1 \rightarrow i$$

and repeats processing from step (10) onward.

In the case described above, an area cutting command is inserted into an NC tape in advance, cutting paths are generated successively by using the area cutting data that follow the area cutting command, and surface cutting is performed by moving a tool along the cutting paths. However, the present invention is not limited to such an arrangement. An arrangement can be adopted in which after the area data are inputted from a keyboard, an NC tape (NC data) is created through a method substantially the same as that described above and the NC tape is inputted to an NC unit to perform area cutting. However, instead of moving the tool in the 12th step, NC data for tool movement would be prepared.

In accordance with the present invention described above, the arrangement is such that the cutting starting point and cutting end point of each cutting path are situated on the offset curve offset by a predetermined amount (the sum of excess thickness, amount of clearance and tool radius) to the outer side of the closed curve CCL specifying the area AR to be surface-cut. As a result, tool pass in the cutting path direction can be minimized in length and surface cutting can be performed at a uniform cut-in amount (W/n every stroke) close to a maximum cut-in amount. This makes it possible to perform highly efficient surface cutting.

We claim:

1. A surface cutting method for cutting a surface within an area bounded by a predetermined closed curve by moving a tool along a cutting path in a predetermined direction to cut the surface within the area, thenceforth moving the tool along an adjacent cutting path obtained by a shift of a predetermined amount to cut the surface, and repeating these surface cutting operations, said method characterized by including:
 a first step of obtaining an offset curve offset by a predetermined amount to the outer side of said closed curve;
 a second step of obtaining width W, in a shift direction, of the area bounded by the offset curve;
 a third step of finding, from among lengths of line segments obtained by dividing said width W into n equal parts (where n is an integer), a length closest to a predetermined maximum cut-in amount without exceeding the same, and adopting said length as an actual cut-in amount P; and
 a fourth step of performing surface cutting by shifting the tool by the cut-in amount P in said shift direction after the end of surface cutting along one cutting path $PT_i$, and thereafter moving the tool along an adjacent cutting path $PT_{i+1}$.

2. A surface cutting method according to claim 1, characterized in that the predetermined amount in said first step is T+C, where T represents excess thickness and C represents amount of clearance.

3. A surface cutting method according to claim 2, characterized in that said fourth step includes:

a step of obtaining the position of the cutting path $PT_{i+1}$ in said shift direction;

a step of obtaining points of intersection $P_{i+1}$, $Q_{i+1}$ between said cutting path $PT_{i+1}$ and an offset curve offset by (T+C+R) to the outer side of said closed path, where T represents excess thickness, C represents amount of clearance and R represents tool radius;

a step of performing surface cutting along said cutting path $PT_{i+1}$ from the point of intersection $P_{i+1}$ to the point of intersection $Q_{i+1}$.

4. A surface cutting method according to claim 3, characterized by obtaining a position Y of the i-th cutting path in the shift direction in accordance with the following equation:

$$Y = Y_0 + W - i \cdot P + R_e$$

where $Y_0$ represents the position of a lowermost end of the area in the shift direction, and $R_e$ represents effective tool radius.

* * * * *